R. E. ATTEBERRY.
ANIMAL POKE.

No. 189,169. Patented April 3, 1877.

Witnesses:
R. K. Evans
R. E. Evans

Inventor
Robt. E. Atteberry
by A. N. Evans & Co.
Attys.

UNITED STATES PATENT OFFICE.

ROBERT E. ATTEBERRY, OF SAVANNAH, IOWA.

IMPROVEMENT IN ANIMAL-POKES.

Specification forming part of Letters Patent No. 189,169, dated April 3, 1877; application filed September 27, 1876.

*To all whom it may concern:*

Be it known that I, ROBERT E. ATTEBERRY, of Savannah, in the county of Davis and State of Iowa, have invented a new and Improved Yoke to Prevent Animals from Jumping; and I hereby declare the following to be a full, clear, and exact description thereof, reference being had to the accompanying drawings, making a part of this specification, in which—

Figure 1:
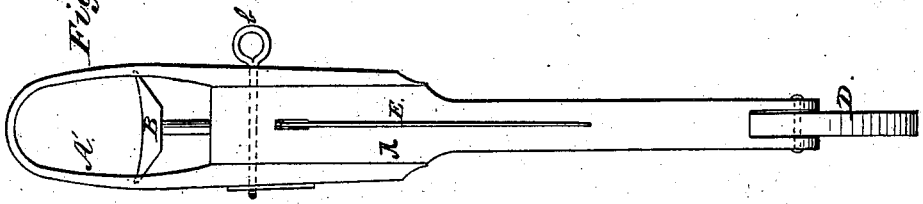
Figure 2:
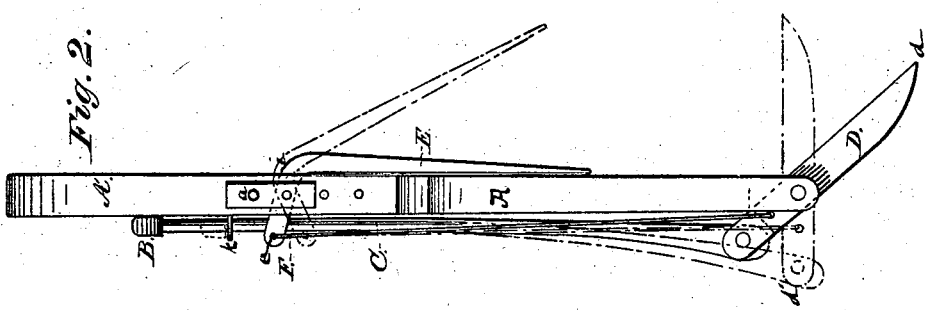
Figure 3:
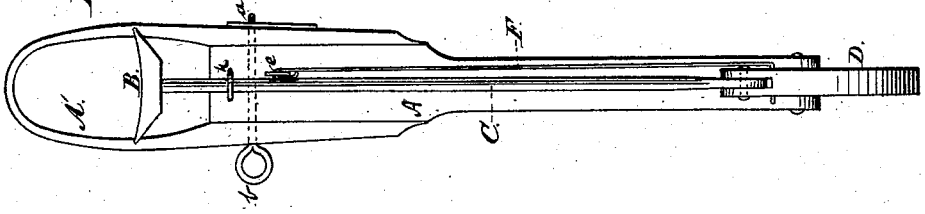

Figure 1 is a front view of the yoke. Fig. 2 is a side view of the same.

My invention relates to that class of devices to prevent animals jumping over or pushing down fences; and it consists of a combination of devices whereby the horse is choked upon any attempt to jump or push down the fence.

In order that those skilled in the art may make and use my invention, I will proceed to describe the manner in which I have carried it out.

In the said drawings, A is the main shank, having at its upper end the yoke A', made adjustable by means of holes $a\ a$ and the bolt $b$. Transverse to bar A, and pivoted in an offset in its lower end, is a lever, D, having a long end, $d$, and a short end, $d'$. Pivoted in this lever is a rod, C, passing along the length of bar A, and through an eye, $k$, terminating in a bow-shaped cross-bar, B, which rests immediately under the animal's throat when the yoke is on. Passing through bar A, near yoke A', and pivoted in said bar, is a finger, E, bent at $i$, and attached by an eye, $k$, to a rod, F, the other end of which engages in the short arm of lever D.

The operation is as follows: If the animal attempts to jump, the long arm $d$ of the lever catches and forces up rod C, and, through the medium of cross-piece B, chokes the animal till he desists. If the animal attempts to push down the fence the finger E is forced into the position shown in the dotted lines. This, through the means of rod F, brings up the short end of lever D, forces up rod C, and chokes the animal, as in the previous instance.

Having thus described my invention, what I claim as new, and desire to secure by Letters Patent, is—

The bar A, provided with a suitable yoke, A', in combination with lever D, rod C, having cross-piece B, bent finger E, and rod F, constructed and arranged as and for the purpose set forth.

ROBERT E. ATTEBERRY.

Witnesses:
 PALMER TRIMBLE,
 S. S. CARRUTHERS,
 S. A. SPENCER.